(12) United States Patent
Ito

(10) Patent No.: US 9,954,406 B2
(45) Date of Patent: Apr. 24, 2018

(54) MOTOR HAVING FIGURE 8-SHAPED LINKED COILS AND METHOD FOR MANUFACTURING THE SAME

(71) Applicant: FANUC CORPORATION, Yamanashi (JP)

(72) Inventor: Takashi Ito, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 155 days.

(21) Appl. No.: 15/183,873

(22) Filed: Jun. 16, 2016

(65) Prior Publication Data

US 2016/0380497 A1    Dec. 29, 2016

(30) Foreign Application Priority Data

Jun. 25, 2015    (JP) .................................. 2015-128025

(51) Int. Cl.
*H02K 3/28*    (2006.01)
*H02K 15/04*   (2006.01)

(52) U.S. Cl.
CPC ............ *H02K 3/28* (2013.01); *H02K 15/045* (2013.01)

(58) Field of Classification Search
CPC ............ H02K 3/28; H02K 1/16; H02K 15/02; H02K 3/12; H02K 15/045
USPC ................................................. 310/179–210
See application file for complete search history.

(56) References Cited

FOREIGN PATENT DOCUMENTS

| JP | 4836601 A | 5/1973 |
|----|-----------|--------|
| JP | 260438 A | 2/1990 |
| JP | 200464990 A | 2/2004 |
| JP | 200533924 A | 2/2005 |
| JP | 2005318733 A | 11/2005 |
| JP | 201239811 A | 2/2012 |
| JP | 2012196133 A | 10/2012 |
| JP | 2016005409 A | 1/2016 |

OTHER PUBLICATIONS

English Abstract and Machine Translation for Japanese Publication No. 2016-005409, published Jan. 12, 2016, 20 pgs.
English Abstract for Japanese Publication No. 2012-196133 A, published Oct. 11, 2012, 1 pg.
English Abstract for Japanese Publication No. 2012-039811 A, published Feb. 23, 2012, 1 pg.
English Abstract for Japanese Publication No. 2005318733 A, published Nov. 10, 2005, 1 pg.
English Abstract for Japanese Publication No. 2005033924 A, published Feb. 3, 2005, 1 pg.

(Continued)

*Primary Examiner* — Naishadh Desai
(74) *Attorney, Agent, or Firm* — Fredrikson & Byron, P.A.

(57) ABSTRACT

In a motor, the number of slots 6N divided by the number of pole pairs P (2N>P) of a rotor is an irreducible fraction, when a quotient obtained by dividing 6N by 2P is denoted by X, 2N coils per phase are arranged in the slots of the stator, one and another one of the coils connected in series thereto are arranged overlapping in one center slot while sharing one side with aligned current directions, opposite sides of the two coils not sharing the slot are each arranged in other ones of the slots at a distance by X from the center slot, so that the two coils are arranged while being linked in a figure 8-shape straddling over the three slots, and N sets per phase of the linked coils are arranged at not completely overlapping positions in the slots and are connected in series.

7 Claims, 16 Drawing Sheets

MULTIPLE COIL PRODUCTION

(56) References Cited

OTHER PUBLICATIONS

English Abstract for Japanese Publication No. 2004064990 A, published Feb. 26, 2004, 1 pg.
English Abstract for Japanese Publication No. 02060438 A, published Feb. 28, 1990, 1 pg.
English translation for Japanese Publication No. 48-036601 A, published May 30, 1973, 3 pages.
Untranslated Decision to Grant a Patent mailed by Japan Patent Office (JPO) for Application No. JP 2015-128025, dated Aug. 2, 2017, 3 pages.
English machine translation of Decision to Grant a Patent mailed by Japan Patent Office (JPO) for Application No. JP 2015-128025, dated Aug. 2, 2017, 3 pages.

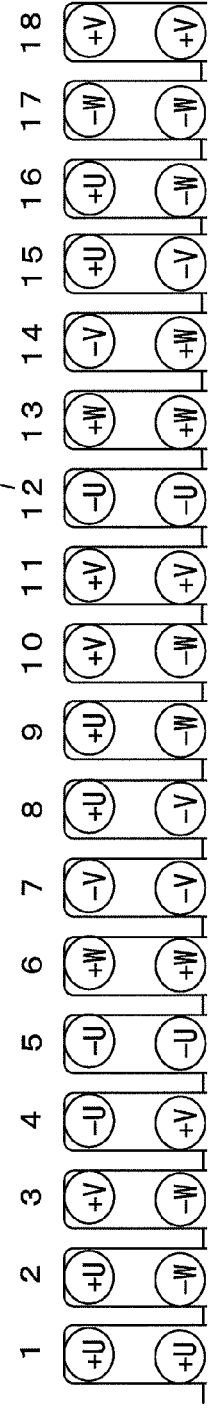
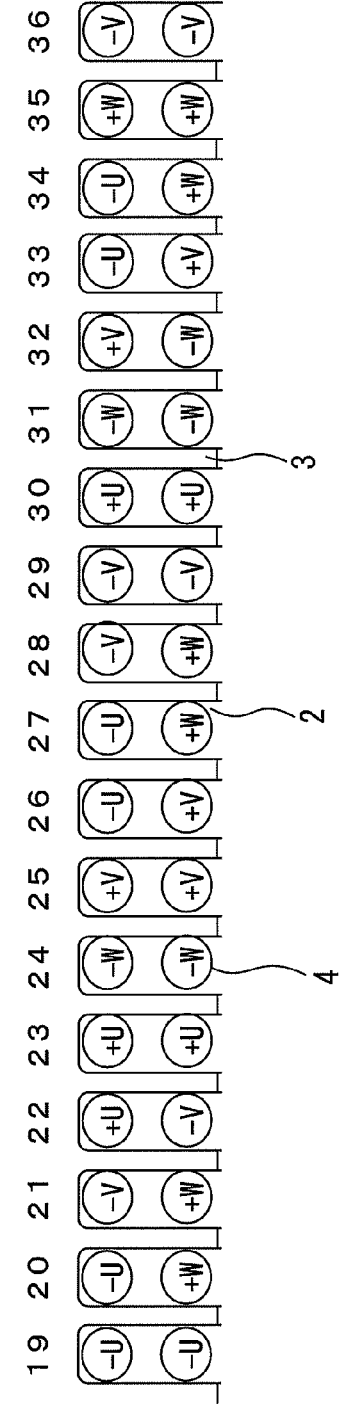
FIG. 2A
FIG. 2B

SINGLE COIL PRODUCTION

MULTIPLE COIL PRODUCTION

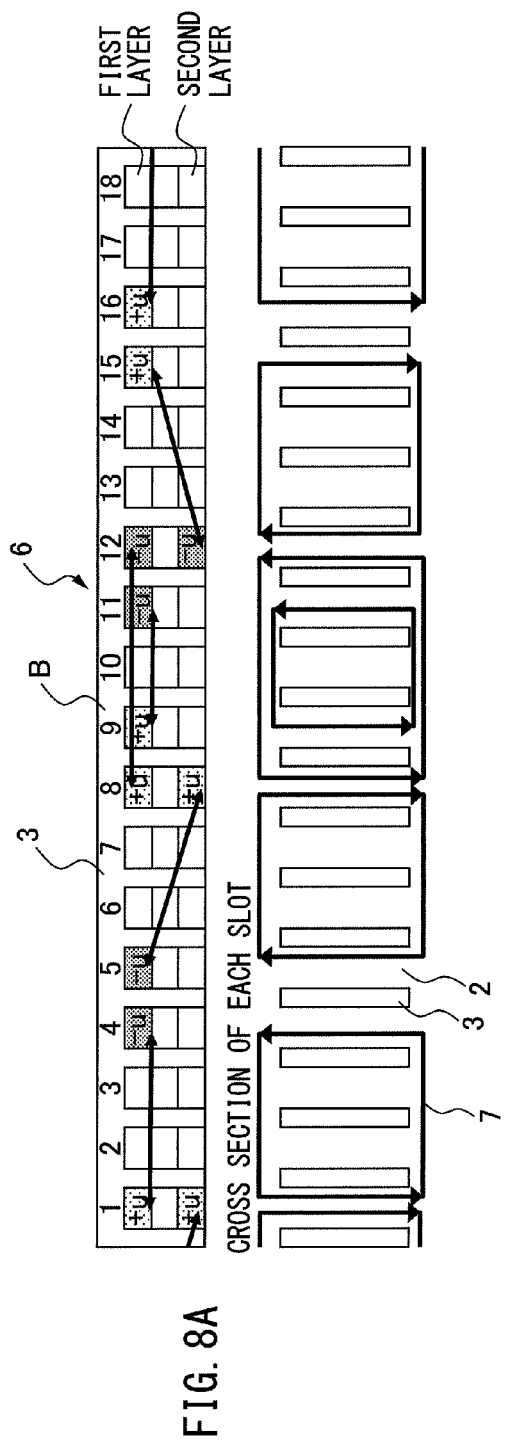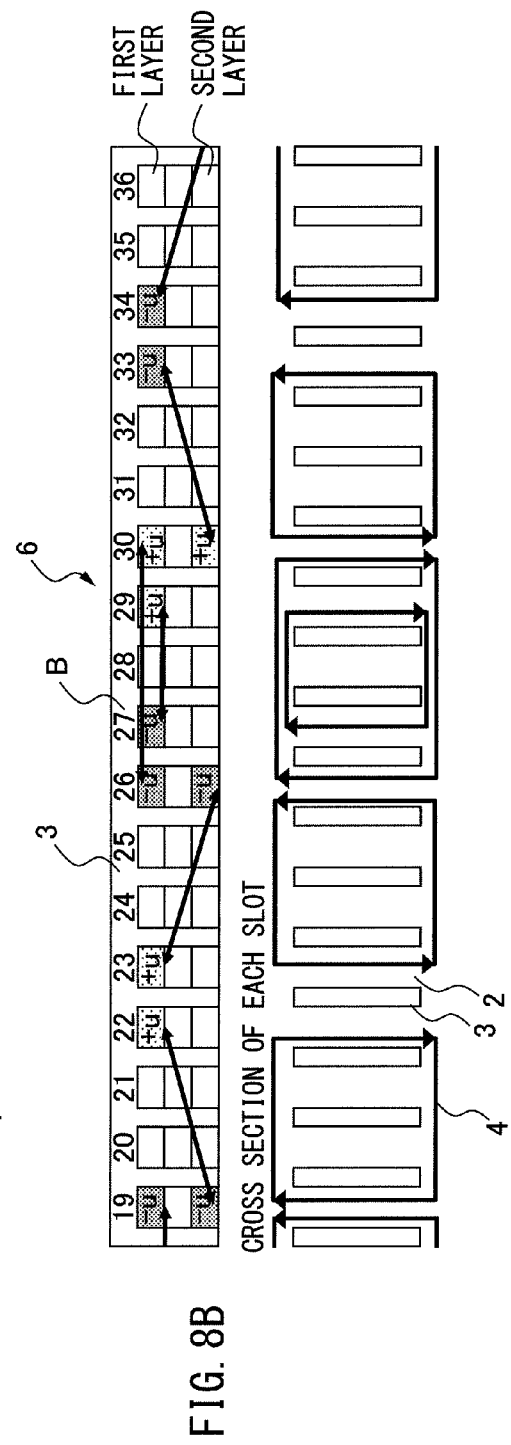
FIG. 8A
FIG. 8B

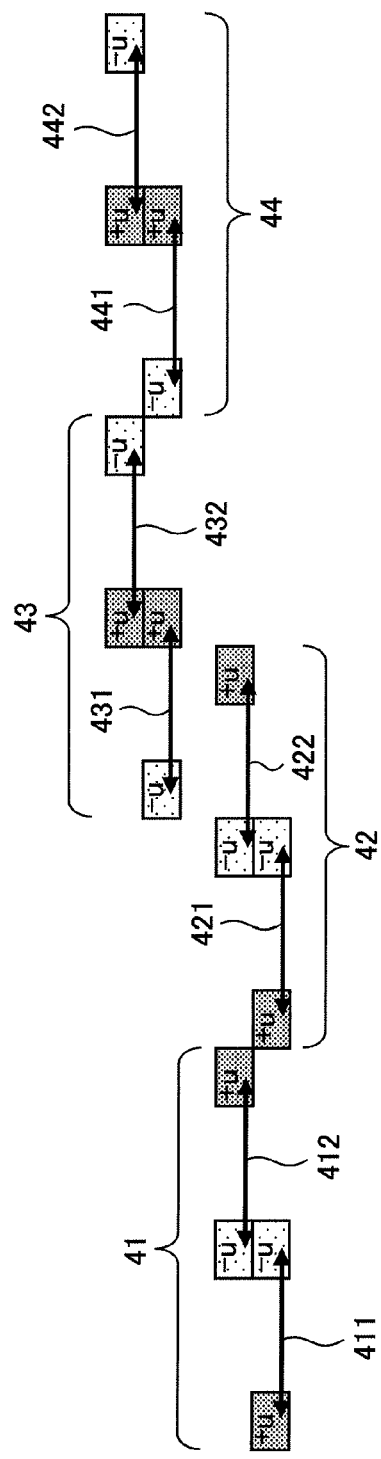

[THIRD STEP]

[FOURTH STEP]

FIG. 19
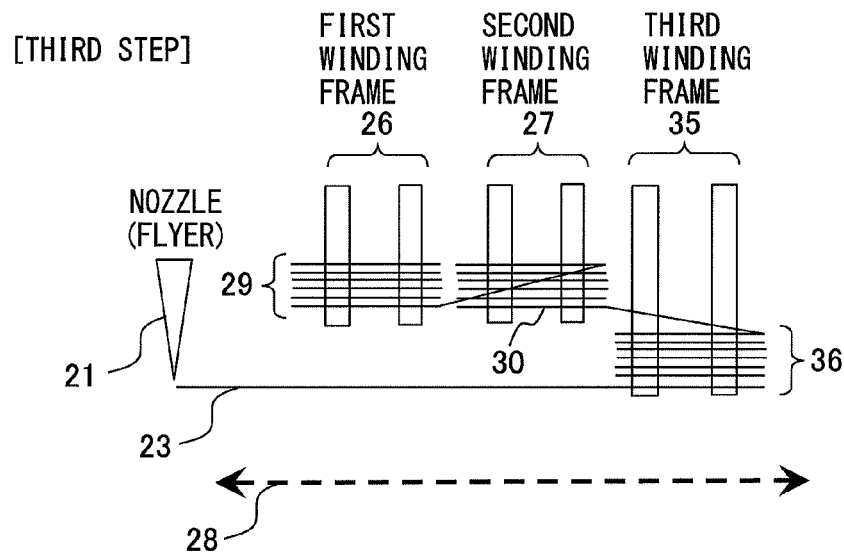
FIG. 20A [FOURTH STEP]
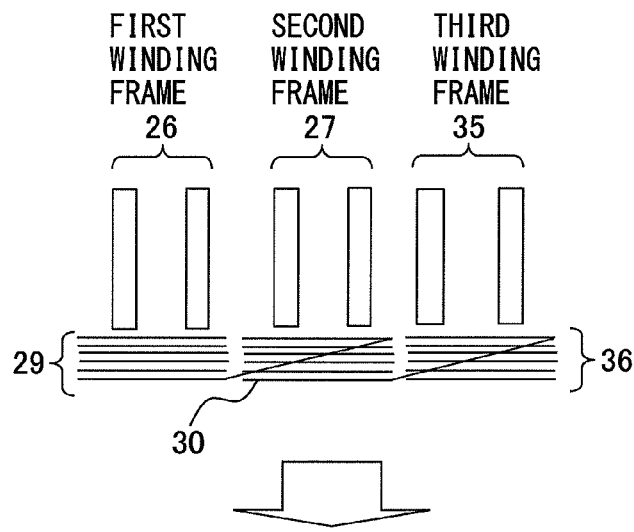
FIG. 20B [FIFTH STEP]
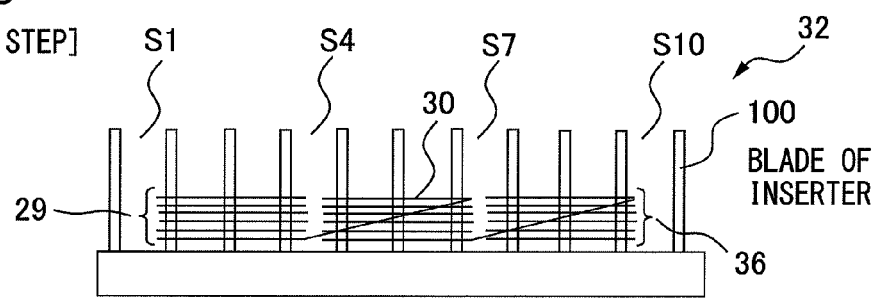

MOTOR HAVING FIGURE 8-SHAPED LINKED COILS AND METHOD FOR MANUFACTURING THE SAME

BACKGROUND OF THE INVENTION

1. Field of the Invention

The present invention relates to a motor and a method for manufacturing the same, and in particular, relates to a motor having figure 8-shaped linked coils and a method for manufacturing the same.

2. Description of the Related Art

As a combination of poles and slots enabling the cogging torque and the torque ripple to be reduced, there is conventionally known a motor having the "fractional slot" configuration where the number of slots divided by the number of poles is an irreducible fraction.

In a fractional slot type motor, it is possible to select the number of poles and the number of slots so as to increase the least common multiple of the number of poles and the number of slots and is possible to set a small value of high-order distributed winding coefficient, thereby enabling the cogging torque and the torque ripple to be reduced (e.g. see Japanese Patent Application No. 2014-125680).

In a motor in which the number of slots 6N is more than 1.5 times but less than 3 times the number of pole pairs P ($1.5P<6N<3P$), the motor is a concentrated winding motor of which the slot pitch is 1. In this case, since it is possible to wind coils around adjacent slots, the coils can be directly wound (i.e., direct winding) around the teeth of the stator using a nozzle of the winding machine. This is very advantageous for production. However, since the number of slots is relatively small, the magnetic flux lines generated in the rotor and the stator are susceptible to the teeth shape of the stator or the external shape of the stator core and thus deteriorate the levels of the cogging torque and the torque ripple. This results in the limited advantageous effects in even the fractional slot configuration.

On the other hand, in a fractional slot type motor in which the number of slots 6N is more than 3 times the number of pole pairs P ($6N>3P$), the cogging torque and the torque ripple tend to become smaller than in a concentrated winding motor of fractional slot configuration, which is appealing in terms of performance. However, the coil pitch of the windings to be inserted into the slots is larger than 1 slot and winding is only possible by distributed winding. In particular, in a motor where the number of slots divided by the number of pole pairs is an irreducible fraction, the layout of the windings is complicated and therefore takes a large number of coils of windings to be inserted into the slots. This is not suited for automation of winding at the time of production.

In addition, the large number of coils increases crossover lines connecting the coils, causing the complicated arrangement of the windings.

As an example, in an inserter type automatic winding machine, a nozzle or a flyer of the winding machine rotates around winding frames to produce coils one by one, the coils thus produced are inserted into the inserter, and the inserter is gradually pushed into the stator, thereby winding the coils around the stator. In this process, if a large number of coils are produced, the number of times of insertion into the inserter increases, resulting in the great number of production steps. Further, since a large number of coils are inserted into the inserter, the large number of crossover lines between the coils makes a complicated arrangement of the windings, causing the manufacturing failure.

Thus, a fractional slot type motor having a complicated winding layout has the following problems when winding is performed by automatically windable concentric winding.

(1) The number of coils is large and, as a result, increases the number of production steps.

(2) The number of crossover lines connecting the coils is large and causes a complicated arrangement.

SUMMARY OF INVENTION

The objective of the present invention is to provide a fractional slot type motor having a complicated winding layout, the motor including a winding structure with less production steps and less crossover lines between the coils, and a method for manufacturing the motor.

A three-phase alternating current motor according to one embodiment of the present invention includes; a rotor having a plurality of pairs of magnetic poles; a stator being formed in a direction of a rotation axis of the rotor, having a plurality of circumferentially arrayed slots and being arranged radially facing the rotor; and a plurality of windings bring inserted into the slots and wound around the stator, wherein when a number of poles of the rotor is denoted by 2P and a number of slots in which windings of the stator are inserted is denoted by 6N, the number of slots 6N divided by a number of pole pairs P is an irreducible fraction and a relation $2N>P$ stands, and wherein in the stator of the three-phase alternating current motor, when a quotient obtained by dividing the number of slots 6N by the number of poles 2P is denoted by X, 2N coils per phase of a predetermined number of windings are arranged in the slots of the stator, one of the coils and another one of the coils connected in series thereto share one side while aligning directions of current, and are arranged overlapping in one center slot, opposite sides of the two coils not sharing the slot are each arranged in other ones of the slots at a distance by X from the center slot, so that the two coils are arranged while being linked in a figure 8-shape straddling over the three slots, and N sets per phase of the figure 8-shaped linked coils are arranged at not completely overlapping positions in the slots of the stator and are connected in series.

A method for manufacturing a three-phase alternating current motor according to one embodiment of the present invention is a method for manufacturing a three-phase alternating current motor including figure 8-shaped linked coils by using an inserter type automatic winding machine that is equipped with a nozzle rotating while releasing windings and has two or more parallel winding frames around which the windings are wound to produce coils, the method including: a first step of adjusting heights of the two winding frames and rotating the nozzle around one of the winding frames by a predetermined number of windings to produce a first coil; a second step of adjusting the heights of the two winding frames and rotating the nozzle around another of the winding frames by a predetermined number of windings in a direction opposite to the rotation direction to produce a second coil having a current direction opposite to that of the first coil; a third step of inserting the two coils into an inserter in such a manner that one overlapping side of the two coils is inserted into one slot; a fourth step of repeating the first step to the third step to produce other figure 8-shaped linked coils and thus produced linked coils are inserted into the inserter; and a fifth step of inserting the inserter into a stator, thereby inserting all the windings into the stator.

BRIEF DESCRIPTION OF THE DRAWINGS

The objectives, features and advantages of the present invention will be more apparent from the following description of embodiments taken in connection with the accompanying drawings, in which:

FIG. 2A is a developed cross-sectional view of a winding layout for 1st through 18th slots in a 10-pole 36-slot motor;

FIG. 2B is a developed cross-sectional view of a winding layout for 19th through 36th slots in the 10-pole 36-slot motor;

FIG. 8A is a developed cross-sectional view illustrating a winding layout for 1st through 18th slots when U-phase coils are wound by concentric winding in the 10-pole 36-slot motor;

FIG. 8B is a developed cross-sectional view illustrating a winding layout for 19th through 36th slots when U-phase coils are wound by concentric winding in the 10-pole 36-slot motor;

FIG. 9A is a developed cross-sectional view illustrating a winding layout in the 10-pole 36-slot motor;

FIG. 9B is a cross-sectional view of figure 8-shaped linked coils in the 10-pole 36-slot motor;

FIG. 19 is a diagram illustrating a third step in the method for producing three linked coils by the inserter type automatic winding machine;

FIG. 20A is a diagram illustrating a fourth step in the method for producing three linked coils by the inserter type automatic winding machine; and FIG. 20B is a diagram illustrating a fifth step in the method for producing three linked coils by the inserter type automatic winding machine.

DETAILED DESCRIPTION

A motor and a method for manufacturing the same according to the present invention will be described below with reference to the drawings.

First Embodiment

Figure 1:
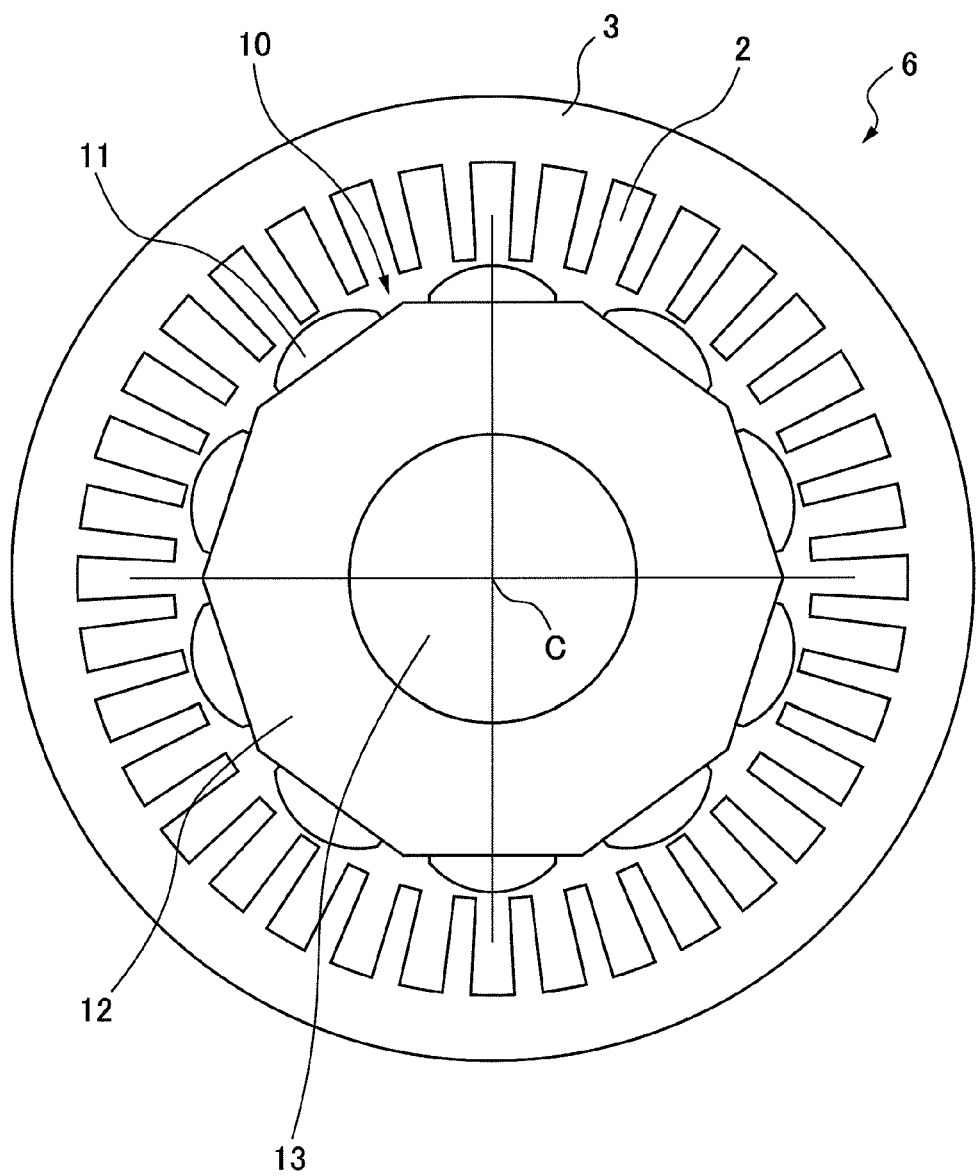
FIG. 1 is a cross-sectional view of a 10-pole 36-slot motor.

A three-phase alternating current (AC) motor according to a first embodiment of the present invention is described. FIG. 1 illustrates a cross-sectional view of a 10-pole 36-slot motor. In FIG. 1, 6 denotes a stator and 10 denotes a rotor. The rotor 10 includes ten magnets 11, a rotor core 12, and a shaft 13 of the rotor, and the rotor 10 rotates about a rotation axis C of the rotor. The number of magnetic poles P is ten, which is the same as the number of the magnets. The stator 6 includes a stator core 3, and thirty six slots 2 formed in the direction of the rotation axis C of the rotor and circumferentially arrayed, and windings to be described later are arranged in the slots 2. The present invention relates to the layout of the windings wound around the stator core 3 in the motor, and therefore the description of the rotor will be omitted in the following.

FIG. 2 is a view illustrating a layout of coils of each phase in the slots in a fractional slot type motor with ten poles, thirty six slots, and three slots shifted. 2 denotes the slots of the stator core, 3 denotes the stator core, 4 denotes windings (coils), and 6 denotes the stator. The number B on the top side of each slot 2 is the slot identification number. U, V, and W represent each phase of the three-phase alternating current and have a phase difference of ±120 degrees with respect to one another. The "+" and "−" indicate the current directions, and the phase difference is 180 degrees. FIG. 2 illustrates an example of two-layer windings, where two phases, among six phases in total of +U, −U, +V, −V, +W and −W are arranged at each slot. The same number of wire rods, such as copper wires, through which current flows are each inserted into each arrangement area. Although the stator 6 in general has a cylindrical shape, a linearly developed cross-sectional view of the cylindrical stator 6 is illustrated herein for easy understanding of the description. In the following, when describing the layout of the windings 4 in the stator 6, the developed cross-sectional view is used to describe the stator 6 and the layout of the windings 4. FIG. 2A illustrates the cross section of the developed stator 6 for part of the slot identification numbers 1 through 18, and FIG. 2B illustrates the cross section for part of the slot identification numbers 19 through 36.

Hereinafter, a wire rod, such as a copper wire, through which current flows or bundles of the wire rods is referred to as "a winding". A stack of bundles of the closed ring-shaped wire rods overlapping on one another while being linked in a same shape is referred to as "a coil".

Figure 3:
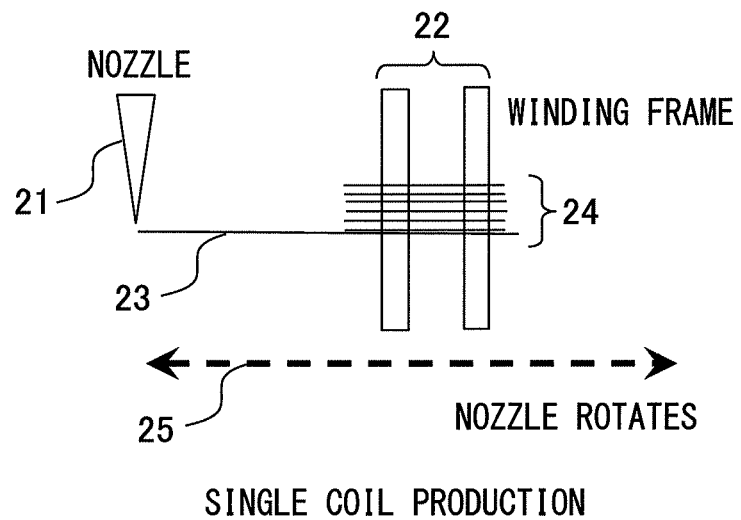
FIG. 3 is a diagram illustrating a method for producing a single coil by an inserter type winding machine.

Next, a method for producing a single coil using an inserter type winding machine is described with reference to FIG. 3. As illustrated in FIG. 3, a nozzle 21 rotates within the range of an arrow 25 and winds a winding 23 around a winding frame 22 to produce a single coil 24.

Figure 4:
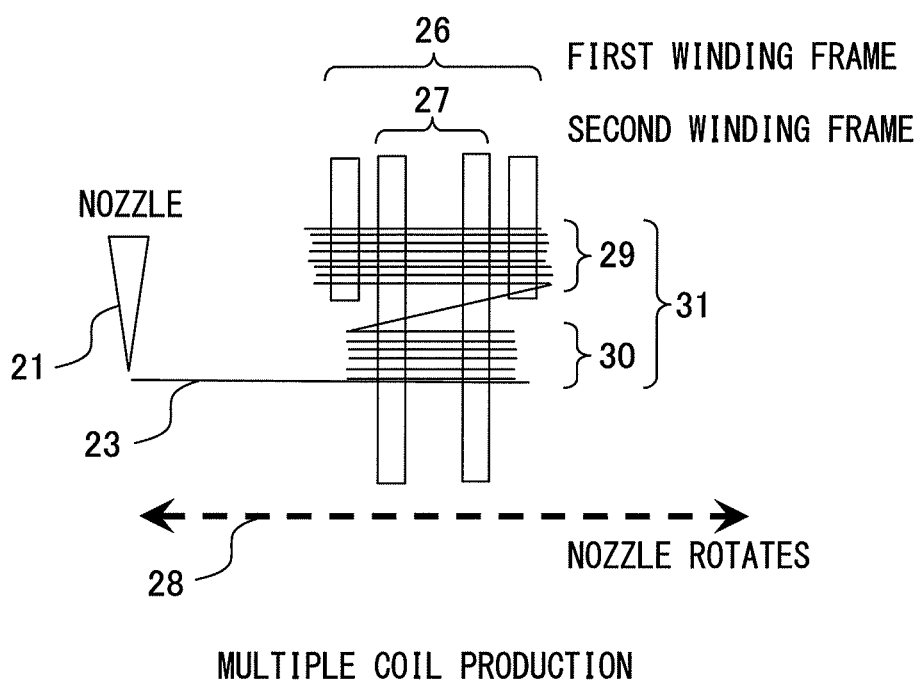
FIG. 4 is a diagram illustrating a method for producing a multiple coil by the inserter type winding machine.

Next, a method for producing a multiple coil using the inserter type winding machine is described with reference to FIG. 4. Firstly, the nozzle 21 rotates within the range of the arrow 28 and winds the winding 23 around a first winding frame 26 to produce an outer coil 29 of a multiple coil 31. Next, the nozzle 21 rotates within the range of the arrow 28 and winds the winding 23 around a second winding frame 27 to produce an inner coil 30 of the multiple coil 31.

Figure 5:
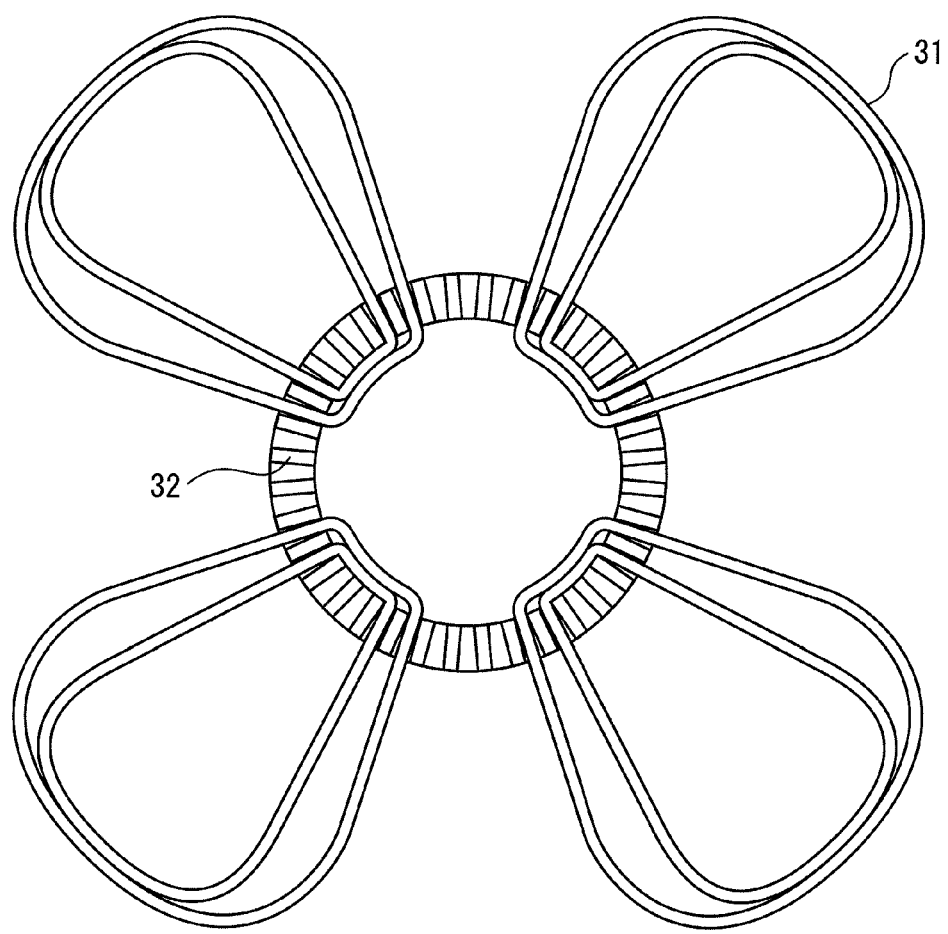
FIG. 5 is an overhead view of an inserter with coils inserted thereinto viewed from above the inserter.
Figure 6:
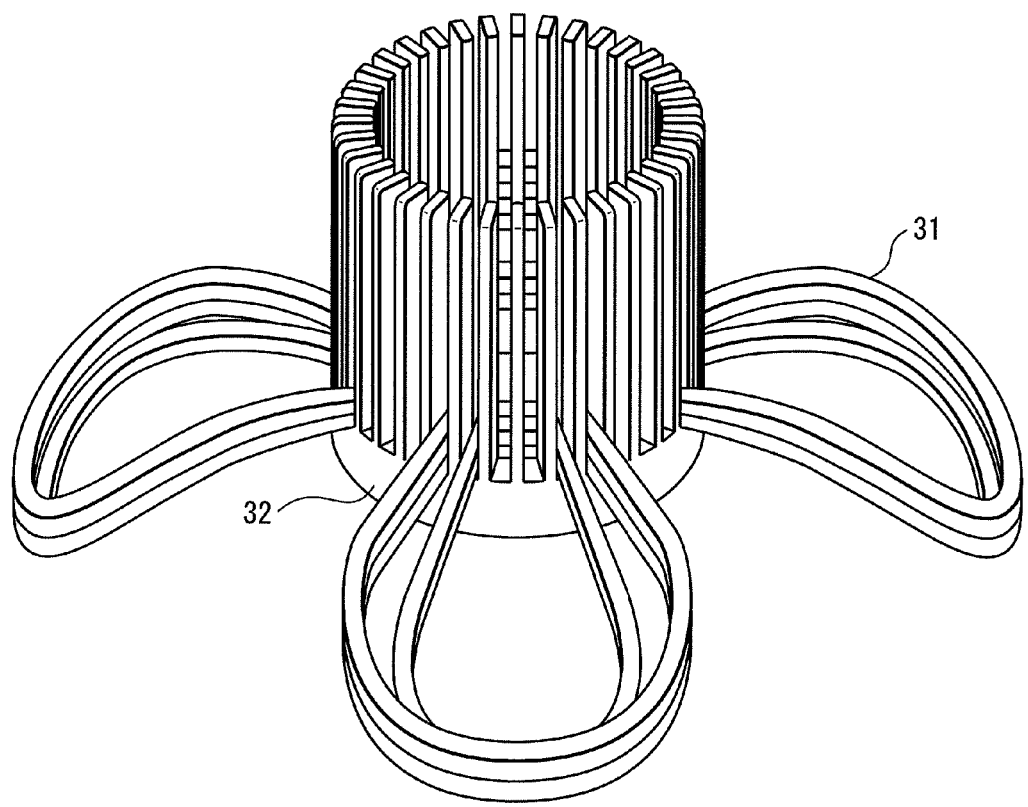
FIG. 6 is a perspective view of the inserter with coils inserted thereinto.

Next, thus produced multiple coil 31 is inserted into an inserter 32 as illustrated in a plan view of FIG. 5 and a perspective view of FIG. 6. FIG. 5 and FIG. 6 illustrate an example of an 8-pole 36-slot motor with the double concentric winding coils 31 inserted into the inserter 32 by a single-phase worth.

Figure 7:
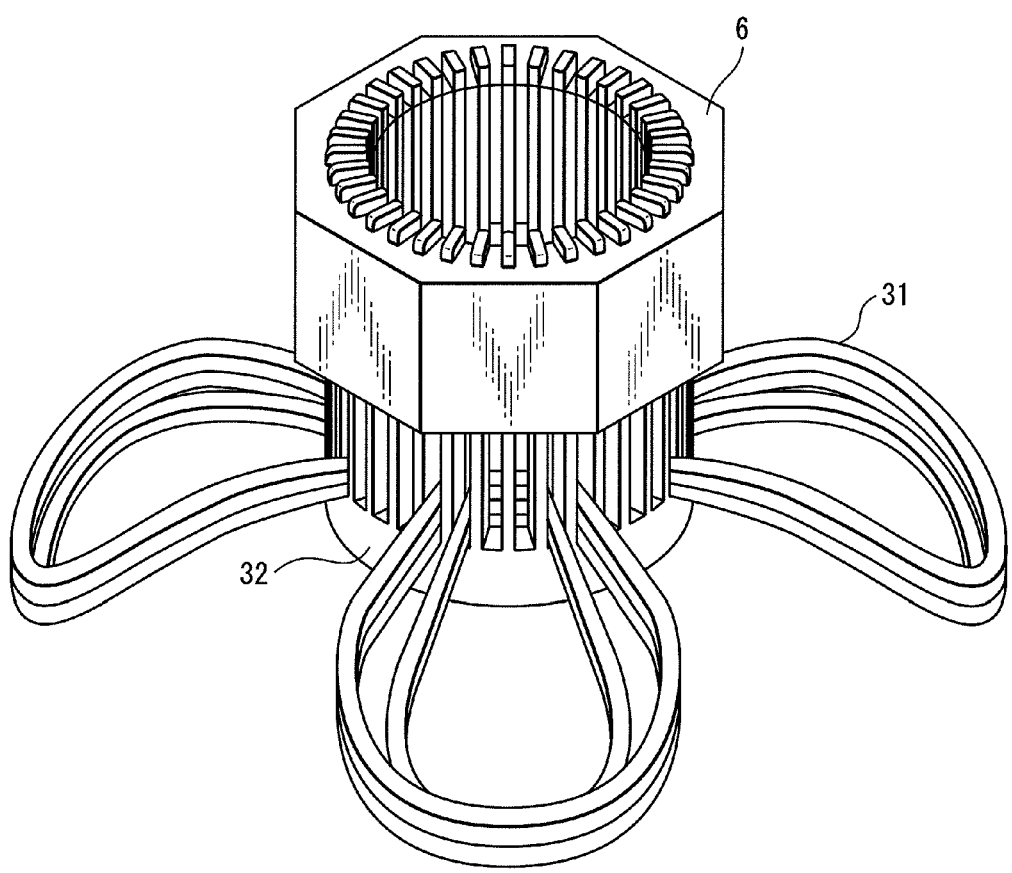
FIG. 7 is a perspective view of the inserter inserted into a stator.

Next, as illustrated in FIG. 7, the inserter 32 is inserted into the stator 6 to push the coils 31 into the stator 6. In this regard, a guide jig (not illustrated) for pushing the coils 31 is arranged inside the inserter 32 in practice.

FIG. 8A is a developed cross-sectional view illustrating a winding layout for 1st through 18th slots when U-phase coils are wound by concentric winding in the 10-pole 36-slot motor. FIG. 8B is a developed cross-sectional view illustrating a winding layout for 19th through 36th slots when U-phase coils are wound by concentric winding in the 10-pole 36-slot motor.

The upper section in each of FIG. 8A and FIG. 8B illustrates a cross-sectional view taken along a cross section perpendicular to the axis of the rotor, and the lower section illustrates a positional relation between the coils and the slots viewed from the rotation axis of the rotor. In FIG. 8A and FIG. 8B, only the layout of U-phase coils is illustrated. In addition, in the upper section in each of FIG. 8A and FIG. 8B, the upper part of the area where the "+u" or "−u" are denoted in each slot indicates a first layer coil and the lower part indicates a second layer coil.

To perform normal concentric winding for a 10-pole 36 slot winding layout, twelve coils per phase indicated as arrows in FIG. 8A and FIG. 8B become necessary, and ten times of insertion into the inserter become necessary. In this case, double concentric windings are formed at two portions. Since the double concentric windings can be formed only at limited portions, the number of production steps increases. Arrows in FIG. 8A and FIG. 8B each represent one coil made up by the "+u" and "−u". In this way, in the motor having the fractional slot configuration where the number of slots divided by the number of poles is an irreducible fraction, the windings become more complicated, and the number of production steps increases.

Next, a three-phase AC motor according to a first embodiment of the present invention is described. FIG. 1 illustrates a cross-sectional view of the three-phase AC motor according to the first embodiment of the present invention, and FIG. 9A and FIG. 9B illustrate an example of application of the 10-pole 36-slot three-phase AC motor according to the first embodiment of the present invention. In FIG. 9A and FIG. 9B, only U-phase is indicated for twenty five slots out of thirty six slots. The three-phase AC motor according to the first embodiment of the present invention includes a rotor 10 having a plurality of pairs of magnetic poles, a stator 6 that is formed in a direction of a rotation axis of the rotor 10, has a plurality of circumferentially arrayed slots 2 and is arranged radially facing the rotor 10, and a plurality of windings 4 inserted into the slots 2 and wound around the stator 6.

In the stator 6 of the three-phase AC motor according to the first embodiment of the present invention, when a number of poles of the rotor 10 is denoted by 2P and a number of slots in which windings of the stator 6 are inserted is denoted by 6N, the number of slots 6N divided by a number of pole pairs P is an irreducible fraction and a relation 2N>P stands. For instance, when the number of poles 2P is 10 and the number of slots 6N is 36, P is 5 and N is 6. However, this is merely an example and the present invention is not limited thereto.

When a quotient obtained by dividing the number of slots 6N by the number of poles 2P is denoted by X, 2N coils (e.g. 411, 412) per phase of a predetermined number of windings are arranged in the slots of the stator 6. For instance, when the number of poles 2P is 10 and the number of slots 6N is 36, X is 3.

One of the coils (e.g. 411) and another one of the coils (e.g. 412) connected in series thereto are arranged overlapping in one center slot (e.g. the slot number 4) while sharing one side with current directions thereof being aligned.

Opposite sides of the two coils 411 and 412 not sharing the slot are each arranged in other ones of the slots (e.g. the slot number 1 and 7) at a distance by X (e.g. 3) from the center slot, and the two coils 411 and 412 are arranged while being linked in a figure 8-shape straddling over the three slots (e.g. the slot number 1, 4 and 7).

N sets per phase of the figure 8-shaped linked coils 41 to 44 are arranged at not completely-overlapping positions in the slots of the stator and are connected in series.

Figure 10A:
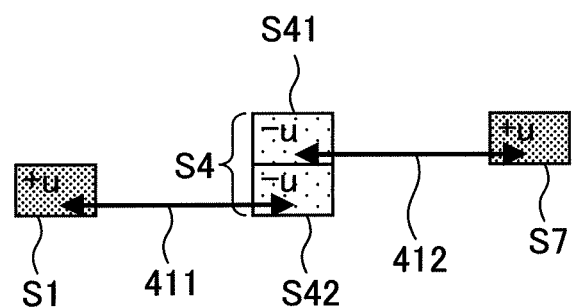
FIG. 10A is a conceptual cross-sectional view of the figure 8-shaped linked coils.
Figure 10B:
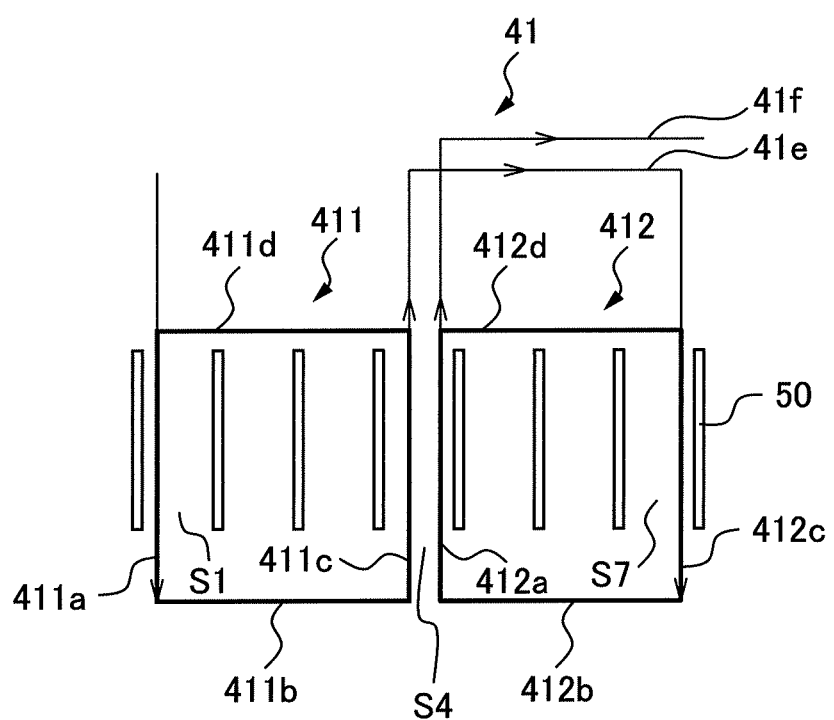
FIG. 10B is a view illustrating a positional relation between the figure 8-shaped linked coils and the slots.

In the three-phase AC motor according to the first embodiment of the present invention, as illustrated in FIG. 9B, a layout of a single phase of the 10-pole 36-slot is developed entirely using 3-slot pitch coils. FIG. 10A illustrates a conceptual cross-sectional view of the figure 8-shaped linked coils 411 and 412. FIG. 10B illustrates a positional relation between the figure 8-shaped linked coils 411 and 412 and the slots. As illustrated in FIG. 10A, one coil 411 is wound straddling across the first slot S1 and the second layer (S42) of the fourth slot. Another coil 412 is wound straddling across the first layer (S41) of the fourth slot and the seventh slot (S7). In this regard, the slots S41 and S42 both are positioned at the fourth slot (S4).

As illustrated in FIG. 10B, the one coil 411 consists of four sides 411a, 411b, 411c and 411d. Likewise, the other coil 412 consists of four sides 412a, 412b, 412c and 412d.

At this time, as illustrated in FIG. 10B, the two coils 411 and 412 are arranged straddling over the three slots S1, S4 and S7 and the coil sides 411c and 412a are arranged together in the one slot S4. Therefore, it is possible to form the figure 8-shaped linked coils 41 by connecting in series, without looseness of a crossover line 41e of the two coils 411 and 412 that configure the figure 8-shaped linked coils. In this regard, the crossover line 41e can be made short and assimilated into the coil 411 or 412. In addition, 50 denotes teeth of the stator, and 41f denotes a winding for connection in series with other figure 8-shaped linked coils.

In the 10-pole 36-slot layout in FIG. 9A and FIG. 9B (illustrating only U-phase for twenty five slots out of thirty six slots), all the coils can form 3-slot pitch figure 8-shaped linked coils. For instance, the coils 421 and 422 configure the figure 8-shaped linked coils 42, the coils 431 and 432 configure the figure 8-shaped linked coils 43, and the coils 441 and 442 configure the figure 8-shaped linked coils 44. The opposite ends of each arrow in FIG. 9B indicate one coil's worth. Each single phase includes six sets of the figure 8-shaped linked coils (only four sets illustrated in FIG. 9B), so that eighteen sets are present in total for three phases.

According to the three-phase AC motor of the first embodiment of the present invention, unlike the complicated coil layout as in FIGS. 8A and 8B, merely preparing a plurality of coil units having the same shape as in FIGS. 9A and 9B enables winding to be performed for the entire winding layout, and therefore it provides advantages that manufacturing of a motor is facilitated.

Second Embodiment

Figure 11A:
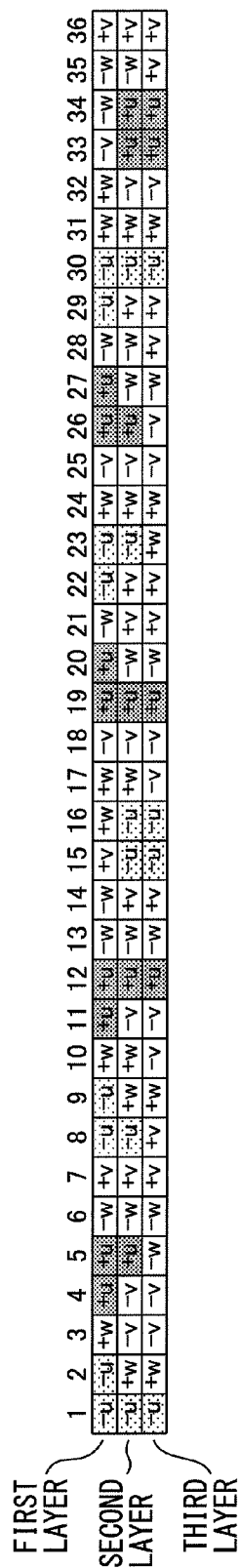
FIG. 11A is a developed cross-sectional view illustrating a winding layout for 10-pole 36-slot 3-layer winding.
Figure 11B:
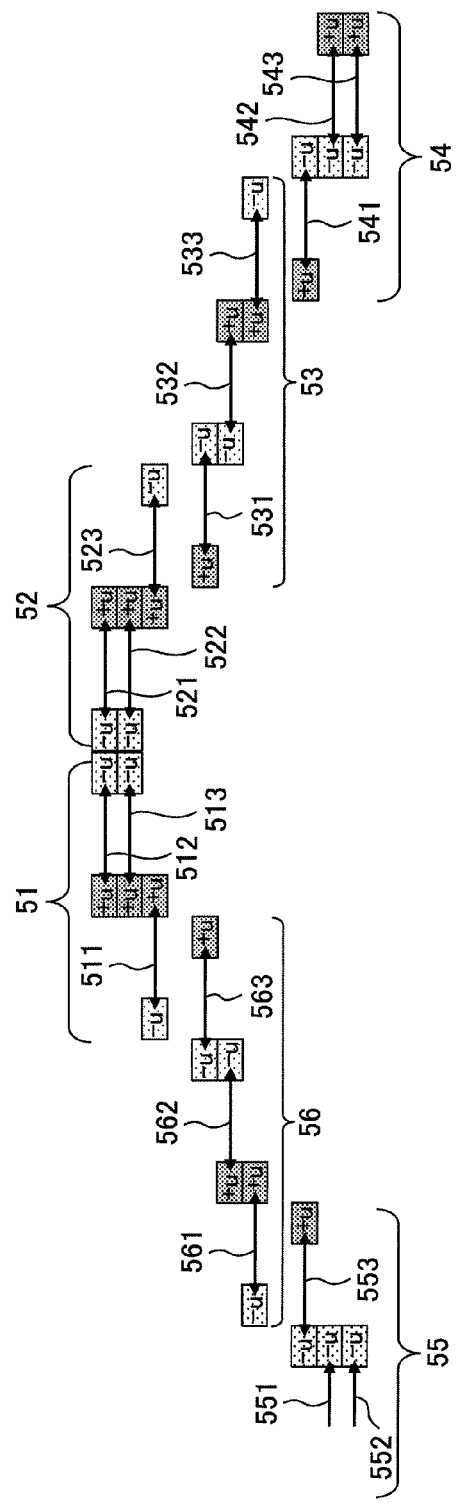
FIG. 11B is a cross-sectional view of three linked coils of 10-pole 36-slot 3-layer winding.

Next, a three-phase AC motor according to a second embodiment of the present invention is described. FIG. 11A and FIG. 11B illustrate a 10-pole 36-slot 3-layer winding layout (three phases arranged for each slot) of the three-phase AC motor according to the second embodiment of the present invention. The three-phase AC motor according to the second embodiment of the present invention is different from the three-phase AC motor according to the first embodiment in terms of the fact that in a plurality of sets out of the N sets per phase of figure 8-shaped linked coils, one coil out of the linked two coils has a number of windings different from that of another coil. Since other configurations of the three-phase AC motor according to the second embodiment of the present invention are the same as the configurations of the three-phase AC motor according to the first embodiment of the present invention, the detailed description will be omitted.

Figure 12A:
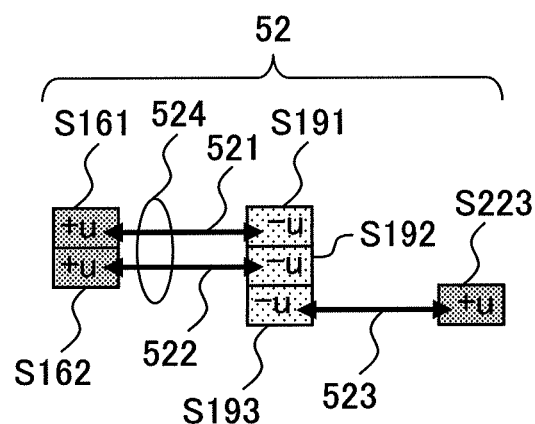
FIG. 12A is a cross-sectional view illustrating an example of the three linked coils.

In the developed view of the coils illustrated in FIG. 11B, units of the coils having the same shape can be sorted into two kinds as in FIG. 12 and FIG. 13. FIG. 12A is a developed view of one set 52 out of coil sets 51 to 56 of the plurality of linked coils that are illustrated in FIG. 11B.

As illustrated in FIG. 12A, the coil 521 is arranged straddling across the first layer (S161) of the sixteenth slot and the first layer (S191) of the nineteenth slot. The coil 522 is arranged straddling across the second layer (S162) of the sixteenth slot and the second layer (S192) of the nineteenth slot. The coil 523 is arranged straddling across the third layer (S193) of the nineteenth slot and the third layer (S223) of the twenty-second slot. In the above example, the coils 521 and 522 can be regarded as one coil 524. Then, it is considered that the number of windings of one coil 523 out of the two linked coils 523 and 524 is different from the number of windings of another coil 524.

Figure 12B:
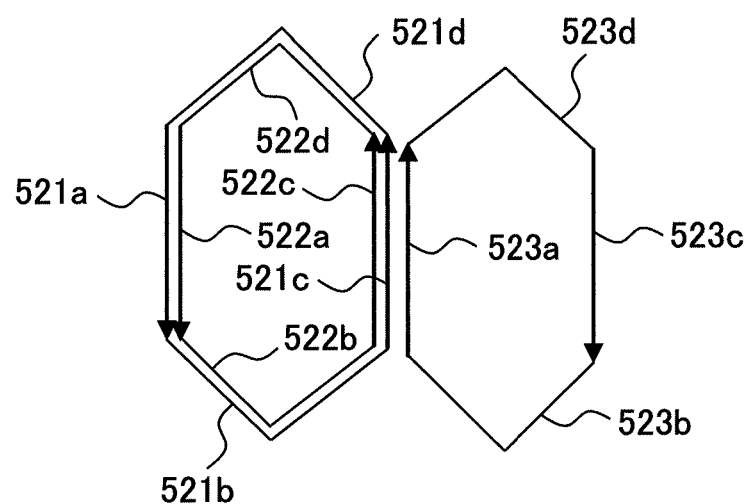
FIG. 12B is a plan view illustrating an example of the three linked coils.

FIG. 12B only illustrates the coils 521 to 523 of FIG. 12A. The coil 521 consists of a plurality of sides 521a to 521d. The coil 522 consists of a plurality of sides 522a to 522d. The coil 523 consists of a plurality of sides 523a to 523d. The sides 521a and 522a are arranged in the sixteenth slot. The sides 521c, 522c and 523a are arranged in the nineteenth slot. The side 523c is arranged in the twenty-second slot.

As illustrated in FIG. 12B, the figure 8-shaped linked coils having different number of windings are present at four portions (51, 52, 54 and 55) in FIG. 11B.

In the linked coils 51, the number of windings of the coil 511 is different from the total number of windings of the coils 512 and 513. In the linked coils 54, the number of windings of the coil 541 is different from the total number of windings of the coils 542 and 543. In the linked coils 55, the number of windings of the coil 553 is different from the total number of windings of the coils 551 and 552.

Figure 13A:
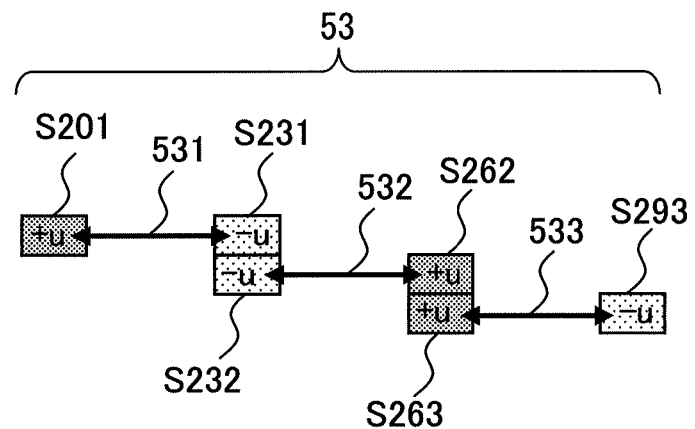
FIG. 13A is a cross-sectional view illustrating another example of the three linked coils.

In other coils 53 and 56, three coils are linked. FIG. 13A is a developed view of one set 53 out of the coil sets 51 to 56 of the plurality of the linked coils illustrated in FIG. 11B.

As illustrated in FIG. 13A, the coil 531 is arranged straddling across the first layer (S201) of the twentieth slot and the first layer (S231) of the twenty-third slot. The coil 532 is arranged straddling across the second layer (S232) of the twenty-third slot and the second layer (S262) of the twenty-sixth slot. The coil 533 is arranged straddling across the third layer (S263) of the twenty-sixth slot and the third layer (S293) of the twenty-ninth slot. In the above example, out of the three coils 531, 532 and 533, one center coil 532 has two sides 532a and 532c respectively sharing one slot (the twenty-third slot and the twenty-sixth slot) with one side 531c and 533a of each of the other two coils 531 and 533.

As described above, the portion where the three coils are linked is present at two portions in FIG. 11B. Except for the above-described linked coils 53, the linked coils 56 have three coils 561, 562 and 563 being linked therein.

Figure 13B:
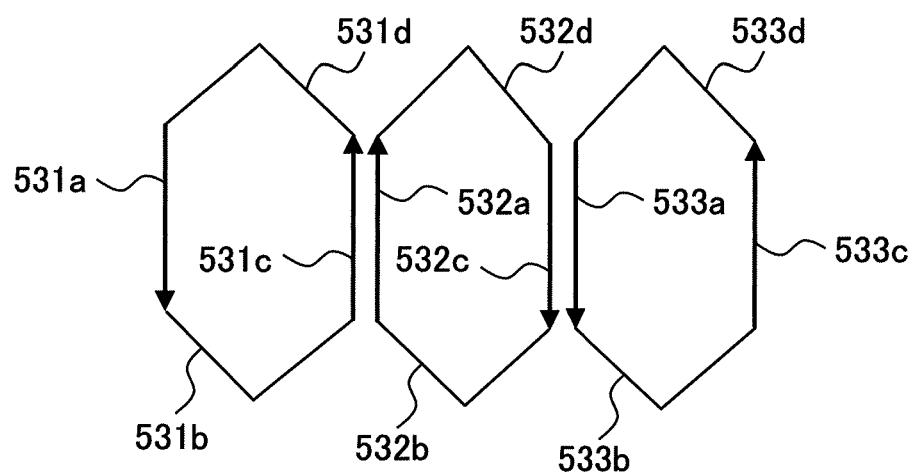
FIG. 13B is a plan view illustrating another example of the three linked coils.

In the above, the example of three linked coils has been described. However, it may be also considered that four coils in two sets of the figure 8-shaped linked coils are linked while sharing two sides of the two coils as follows. A plurality of sets out of N sets per phase of the figure 8-shaped linked coils have two sides across which one coil straddles out of three sides in three slots over which one set of the linked coils straddles overlapping on other two sides across which another coil straddles of another set of the figure 8-shaped linked coils, directions of current flow of the two sides and the other two sides being aligned, so that the two sets of the figure 8-shaped linked coils are linked while sharing two slots, thereby connecting the plurality of sets of the figure 8-shaped linked coils in series. At this time, there may be included linked coils that have, out of two coils configuring each of the two sets of the figure 8-shaped linked coils, one coil having a number of windings different from that of another coil. In the examples of FIG. 13A and FIG. 13B, a set of the figure 8-shaped linked coils in which the winding ratio for the two coils is 2:1 and another set in which the winding ratio for the two coils is 1:2 are overlapped at a portion of the coil having smaller number of windings, thereby forming the three coils having the same winding ratio.

According to the three-phase AC motor of the second embodiment of the present invention, merely preparing a plurality of coil units having two types of shapes enables winding to be performed for the entire winding layout, and therefore the manufacture steps of a motor can be simplified.

Third Embodiment

Next, a method for manufacturing a three-phase AC motor according to a third embodiment of the present invention is described. The method for manufacturing a three-phase AC motor according to the third embodiment of the present invention is a method for manufacturing a three-phase AC motor including figure 8-shaped linked coils by using an inserter type automatic winding machine that is equipped with a nozzle rotating while releasing windings and has two or more parallel winding frames around which the windings are wound to produce coils, the method including a first step of adjusting heights of the two winding frames and rotating the nozzle around one of the winding frames by a predetermined number of windings to produce a first coil, a second step of adjusting the heights of the two winding frames and rotating the nozzle around another of the winding frames by a predetermined number of windings in a direction opposite to the rotation direction to produce a second coil having a current direction opposite to that of the first coil, a third step of inserting the two coils into an inserter in such a manner that one overlapping side of the two coils is inserted into one slot, a fourth step of repeating the first step to the third step to produce other figure 8-shaped linked coils and thus produced linked coils are inserted into the inserter, and a fifth step of inserting the inserter into a stator, thereby inserting all the windings into the stator.

Figure 14:
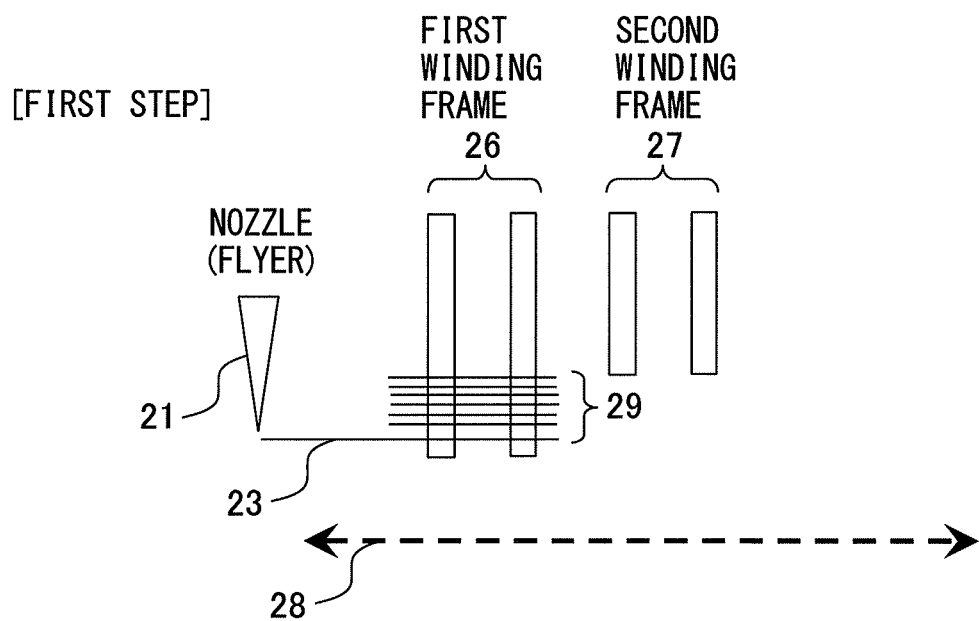
FIG. 14 is a diagram illustrating a first step in a method for producing figure 8-shaped linked coils by an inserter type automatic winding machine.

The method for manufacturing a three-phase AC motor according to the third embodiment of the present invention is described in detail. FIG. 14 is a diagram illustrating the first step in a method for producing figure 8-shaped linked coils by an inserter type automatic winding machine. In the first step, a nozzle (or a flyer) 21 of the automatic winding machine rotates around a first winding frame 26 along a predetermined rotation direction 28 to produce a first coil 29 by means of a winding 23.

Figure 15:
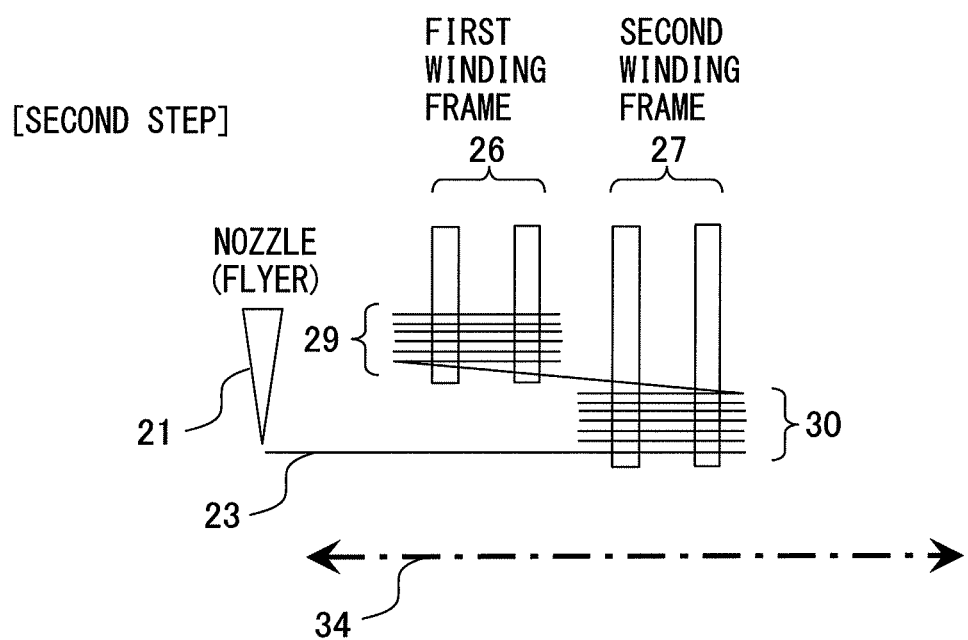
FIG. 15 is a diagram illustrating a second step in the method for producing figure 8-shaped linked coils by the inserter type automatic winding machine.

FIG. 15 is a diagram illustrating the second step in the method for producing figure 8-shaped linked coils by the inserter type automatic winding machine. In the second step, the length of the first winding frame 26 is made small and the length of a second winding frame 27 is made large. Then, while the first coil 29 is not loosened, the nozzle 21 rotates around the second winding frame 27 along a direction 34 opposite to the rotation direction 28 in the first step to produce a second coil 30. In this manner, the figure 8-shaped linked coils are completed.

Figure 16A:
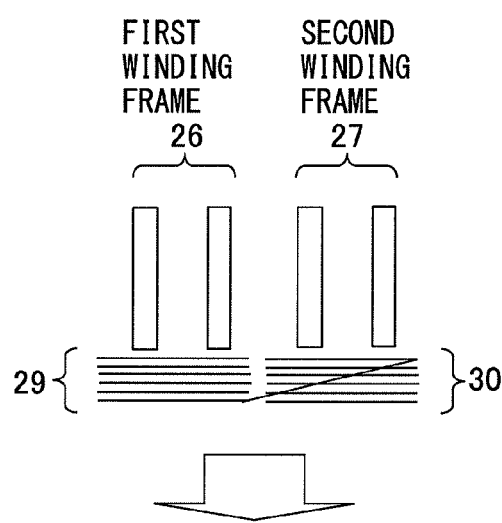
FIG. 16A is a diagram illustrating a third step in the method for producing figure 8-shaped linked coils by the inserter type automatic winding machine.
Figure 16B:
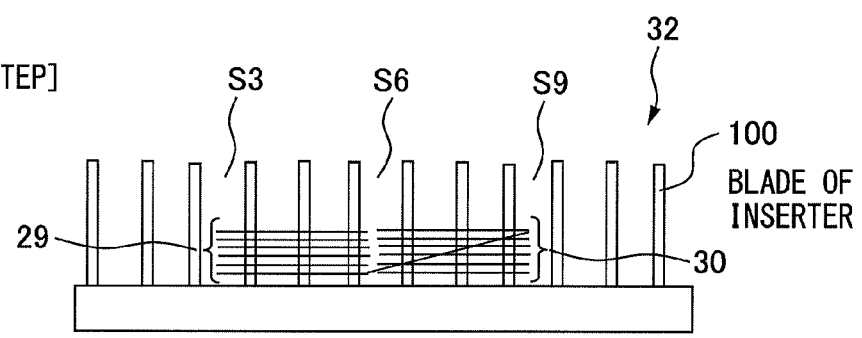
FIG. 16B is a diagram illustrating a fourth step in the method for producing figure 8-shaped linked coils by the inserter type automatic winding machine.

FIG. 16A and FIG. 16B are diagrams respectively illustrating third and fourth steps in the method for producing figure 8-shaped linked coils by the inserter type automatic winding machine. As illustrated in FIG. 16A, in the third step, the coils 29 and 30 are taken off the first winding frame 26 and the second winding frame 27. Thereafter, as illustrated in FIG. 16B, in the fourth step, the coils 29 and 30 in the form of the figure 8-shaped linked coils are inserted into an inserter 32. At this time, blades 100 of the inserter 32 are formed at positions corresponding to the slots, and one side of the coil 29 is arranged at a position corresponding to the third slot S3, for instance. One overlapping side of the coils 29 and 30 is arranged at a position corresponding to the sixth slot S6, for instance. One side of the coil 30 is arranged at a position corresponding to the ninth slot S9, for instance.

The first step to the third step are repeated to produce other figure 8-shaped linked coils, and in the fourth step, thus produced linked coils are inserted into the inserter 32. Further, in the fifth step, the inserter 32 is inserted into the stator 6, thereby inserting all the windings into the stator, as illustrated in FIG. 7.

According to the method for manufacturing the three-phase AC motor of the third embodiment of the present invention, it is possible to easily manufacture the three-phase AC motor that has coils configured by linking two coils in a figure 8-shape.

Fourth Embodiment

Next, a method for manufacturing a three-phase AC motor according to a fourth embodiment of the present invention is described. The method for manufacturing the three-phase AC motor according to the fourth embodiment of the present invention is a method for manufacturing a three-phase AC motor including figure 8-shaped linked coils by using an inserter type automatic winding machine that is equipped with a nozzle rotating while releasing windings and has three parallel winding frames around which the windings are wound to produce coils, the method including, a first step of adjusting heights of the three winding frames and rotating the nozzle around a first winding frame by a predetermined number of windings to produce a first coil, a second step of adjusting the heights of the three winding frames and rotating the nozzle around a second winding frame by a predetermined number of windings in a direction opposite to the rotation direction to produce a second coil having a current direction opposite to that of the first coil, a third step of adjusting the heights of the three winding frames and rotating the nozzle around a third winding frame in a direction opposite to the rotation direction of the second coil to produce a third coil having a current direction opposite to that of the second coil, a fourth step of simultaneously inserting the three coils into an inserter in such a manner that one overlapping side of the first and second coils and another overlapping side of the second and third coils are each inserted into each one slot, a fifth step of repeating the first step to the fourth step to produce other figure 8-shaped linked coils using the two or three winding frames and thus produced linked coils are inserted into the inserter, and a sixth step of inserting the inserter into a stator, thereby inserting all the windings into the stator.

Figure 17:
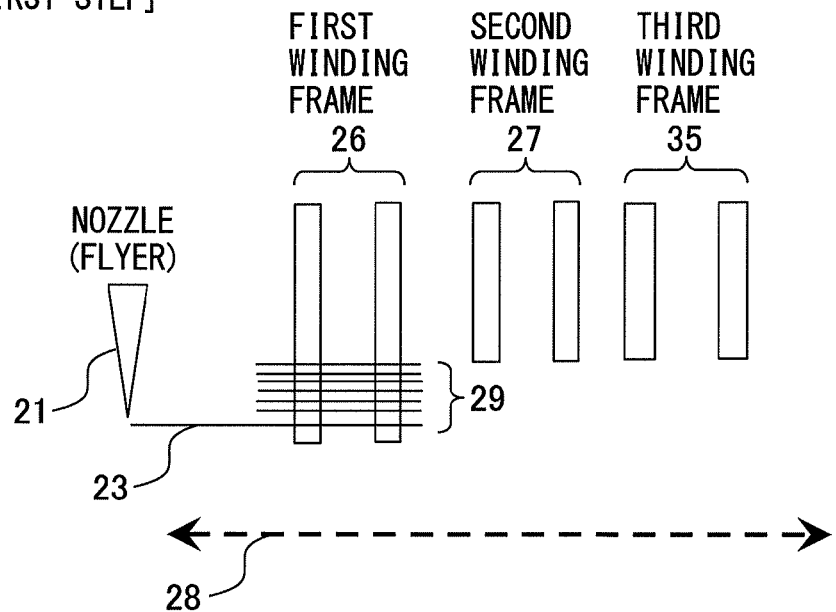
FIG. 17 is a diagram illustrating a first step in a method for producing three linked coils by an inserter type automatic winding machine.

The method for manufacturing a three-phase AC motor according to the fourth embodiment of the present invention is described in detail. FIG. 17 is a diagram illustrating the first step in a method for producing three linked coils by an inserter type automatic winding machine. In the first step, a nozzle (or a flyer) 21 of the automatic winding machine rotates around a first winding frame 26 along a predetermined rotation direction 28 to produce a first coil 29 by means of a winding 23.

Figure 18:
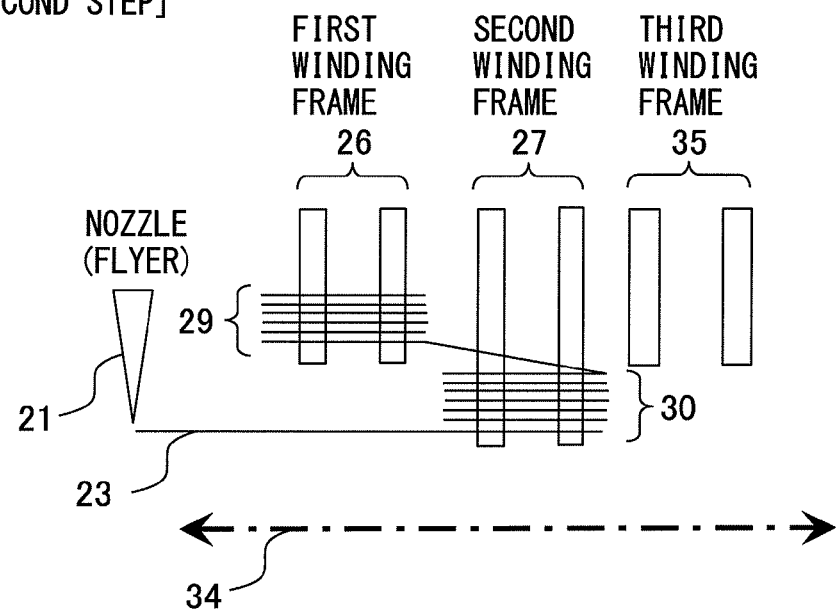
FIG. 18 is a diagram illustrating a second step in the method for producing three linked coils by the inserter type automatic winding machine.

FIG. 18 is a diagram illustrating the second step in the method for producing three linked coils by the inserter type automatic winding machine. In the second step, the length of the first winding frame 26 is made small and the length of a second winding frame 27 is made large. Then, while the first coil 29 is not loosened, the nozzle 21 rotates around the second winding frame 27 along a direction 34 opposite to the rotation direction 28 in the first step to produce a second coil 30.

FIG. 19 is a diagram illustrating the third step in the method for producing three linked coils by the inserter type automatic winding machine. In the third step, the length of the second winding frame 27 is made small and the length of a third winding frame 35 is made large. Then, while the first coil 29 and the second coil 30 are not loosened, the nozzle 21 rotates around the third winding frame 35 along the direction 28 opposite to the rotation direction 34 in the second step to produce a third coil 36.

FIG. 20A and FIG. 20B are diagrams respectively illustrating the fourth step and the fifth step in the method for producing three linked coils by the inserter type automatic winding machine. As illustrated in FIG. 20A, in the fourth step, the coils 29, 30 and 36 are taken off the first winding frame 26, the second winding frame 27 and the third winding frame 35. Thereafter, as illustrated in FIG. 20B, in the fifth step, the coils 29, 30 and 36 in the form of linked coils are inserted into an inserter 32. At this time, blades 100 of the inserter 32 are formed at positions corresponding to the slots, and one side of the coil 29 is arranged at a position corresponding to the first slot S1, for instance. One overlapping side of the coils 29 and 30 is arranged at a position corresponding to the fourth slot S4, for instance. One overlapping side of the coils 30 and 36 is arranged at a position corresponding to the seventh slot S7, for instance.

One side of the coil 36 is arranged at a position corresponding to the tenth slot S10, for instance.

The first step to the fourth step are repeated to produce other figure 8-shaped linked coils using the two or three winding frames, and in the fifth step, thus produced linked coils are inserted into the inserter 32. Further, in the sixth step, the inserter 32 is inserted into the stator 6, thereby inserting all the windings into the stator, as illustrated in FIG. 7.

According to the method for manufacturing the three-phase AC motor of the fourth embodiment of the present invention, it is possible to easily manufacture the three-phase AC motor that has coils configured by linking three coils.

According to a three-phase AC motor of an example of the present invention, it is possible to provide a fractional slot type motor having a complicated winding structure, the motor including a winding structure capable of being automatically wound with less number of coils and production steps, and a method for manufacturing the motor.

What is claimed is:

1. A three-phase alternating current motor comprising:
a rotor having a plurality of pairs of magnetic poles;
a stator being formed in a direction of a rotation axis of the rotor, having a plurality of circumferentially arrayed slots and being arranged radially facing the rotor; and
a plurality of windings being inserted into the slots and being wound around the stator,
wherein when a number of poles of the rotor is denoted by 2P and a number of slots in which windings of the stator are inserted is denoted by 6N, the number of slots 6N divided by a number of pole pairs P is an irreducible fraction and a relation 2N>P stands, and
wherein in the stator of the three-phase alternating current motor,
when a quotient obtained by dividing the number of slots 6N by the number of poles 2P is denoted by X, 2N coils per phase of a predetermined number of windings are arranged in the slots of the stator,
one of the coils and another one of the coils connected in series thereto are arranged overlapping in one center slot while sharing one side with current directions thereof being aligned,
opposite sides of the two coils not sharing the slot are each arranged in other ones of the slots at a distance by X from the center slot, so that the two coils are arranged while being linked in a figure 8-shape straddling over the three slots, and
N sets per phase of the figure 8-shaped linked coils are arranged at not completely overlapping positions in the slots of the stator and are connected in series.

2. The three-phase alternating current motor according to claim 1, wherein the two coils configuring the figure 8-shaped linked coils are connected in series without looseness.

3. The three-phase alternating current motor according to claim 1, wherein in a plurality of sets out of the N sets per phase of figure 8-shaped linked coils, one coil out of the linked two coils has a number of windings different from that of another coil.

4. The three-phase alternating current motor according to claim 1, wherein a plurality of sets out of N sets per phase of the figure 8-shaped linked coils have two sides across which one coil straddles out of three sides in three slots over which one set of the linked coils straddles overlapping on other two sides across which another coil straddles out of three sides of another set of the figure 8-shaped linked coils, directions of current flow of the two sides and the other two sides being aligned, so that the two sets of the figure 8-shaped linked coils are linked while sharing two slots, thereby connecting the plurality of sets of the figure 8-shaped linked coils in series.

5. The three-phase alternating current motor according to claim 4, comprising linked coils that have, out of two coils configuring the figure 8-shaped linked coils, one coil having a number of windings different from that of another coil.

6. A method for manufacturing a three-phase alternating current motor comprising figure 8-shaped linked coils by using an inserter type automatic winding machine that is equipped with a nozzle rotating while releasing windings and has two or more parallel winding frames around which the windings are wound to produce coils, the method comprising:
a first step of adjusting heights of the two winding frames and rotating the nozzle around one of the winding frames by a predetermined number of windings to produce a first coil;
a second step of adjusting the heights of the two winding frames and rotating the nozzle around another of the winding frames by a predetermined number of windings in a direction opposite to the rotation direction to produce a second coil having a current direction opposite to that of the first coil;
a third step of inserting the two coils into an inserter in such a manner that one overlapping side of the two coils is inserted into one slot;
a fourth step of repeating the first step to the third step to produce other figure 8-shaped linked coils and thus produced linked coils are inserted into the inserter; and
a fifth step of inserting the inserter into a stator, thereby inserting all the windings into the stator.

7. A method for manufacturing a three-phase alternating current motor comprising figure 8-shaped linked coils by using an inserter type automatic winding machine that is equipped with a nozzle rotating while releasing windings and has three parallel winding frames around which the windings are wound to produce coils, the method comprising:
a first step of adjusting heights of the three winding frames and rotating the nozzle around a first winding frame by a predetermined number of windings to produce a first coil;
a second step of adjusting the heights of the three winding frames and rotating the nozzle around a second winding frame by a predetermined number of windings in a direction opposite to the rotation direction to produce a second coil having a current direction opposite to that of the first coil;
a third step of adjusting the heights of the three winding frames and rotating the nozzle around a third winding frame in a direction opposite to the rotation direction of the second coil to produce a third coil having a current direction opposite to that of the second coil;
a fourth step of simultaneously inserting the three coils into an inserter in such a manner that one overlapping side of the first and second coils and another overlapping side of the second and third coils are each inserted into each one slot;
a fifth step of repeating the first step to the fourth step to produce other figure 8-shaped linked coils using the two or three winding frames and thus produced linked coils are inserted into the inserter; and
a sixth step of inserting the inserter into a stator, thereby inserting all the windings into the stator.

* * * * *